United States Patent
Espejo Pina et al.

(10) Patent No.: US 11,035,102 B2
(45) Date of Patent: Jun. 15, 2021

(54) AUTONOMOUS MONITORING SYSTEM BASED ON MAGNETIC FIELD VARIATION, ALLOWING UNCRUSHABLE MATERIAL TO BE PREDICTED, ANTICIPATED AND DETECTED IN REAL TIME AND THEIR ASSOCIATED METHODS

(71) Applicant: UNIVERSIDAD DE SANTIAGO DE CHILE, Santiago (CL)

(72) Inventors: Alvaro Espejo Pina, Santiago (CL); Nicolas Vargas Ayala, Santiago (CL); Dora Altbir Drullinsky, Santiago (CL); Juliano Casagrande Denardin, Santiago (CL)

(73) Assignee: UNIVERSIDAD DE SANTIAGO DE CHILE, Santiago (CL)

( * ) Notice: Subject to any disclaimer, the term of this patent is extended or adjusted under 35 U.S.C. 154(b) by 0 days.

(21) Appl. No.: 16/475,237

(22) PCT Filed: Dec. 28, 2017

(86) PCT No.: PCT/CL2017/000044
§ 371 (c)(1),
(2) Date: Jul. 2, 2019

(87) PCT Pub. No.: WO2018/119529
PCT Pub. Date: Jul. 5, 2018

(65) Prior Publication Data
US 2019/0338497 A1    Nov. 7, 2019

(30) Foreign Application Priority Data
Dec. 30, 2016   (CL) .................................. 3404-2016

(51) Int. Cl.
*G01N 27/82*    (2006.01)
*G01V 3/10*    (2006.01)
(Continued)

(52) U.S. Cl.
CPC ................ *E02F 9/267* (2013.01); *B60Q 9/00* (2013.01); *B65G 11/206* (2013.01);
(Continued)

(58) Field of Classification Search
None
See application file for complete search history.

(56) References Cited

U.S. PATENT DOCUMENTS 8,076,927 B2 *   12/2011   Ausserlechner ..... G01R 33/095
                                             324/207.21
8,284,096 B2    10/2012   Martinez Godoy et al.
(Continued)

FOREIGN PATENT DOCUMENTS

CL    2009001924 A1    6/2010
CL    2011000274 A1    5/2011
(Continued)

OTHER PUBLICATIONS

Chile office action dated Dec. 30, 2016; No. 201603404.
(Continued)

*Primary Examiner* — John F Mortell

(57) ABSTRACT

1. —It is disclosed an autonomous monitoring system based on a magnetic field variation: (a) that allows (i) predicting wear, failures and cracks in mining equipment; (ii) prevent and detect, in real time, uncrushable material such as metal and/or material from "old mining" or past operations and/or parts or pieces of mining equipment; (b) to be used/installed in mining and/or loading equipment, such as, but not limited to, cables shovel, hydraulic shovel, a loader or other type of loader; (c) that allows detecting strange metal bodies, and also, knowing the level of wear and/or detecting a failure or fracture in the parts of these equipment almost immediately, particularly, but not limited to, the teeth or part of them, preventing unscheduled stops and accidents of the person-
(Continued)

nel, and improving effectiveness and efficiency in the planning of predictive and preventative maintenance operations;
2.—an installation method of the system.
3.—an operating method of the system.
4.—tooth, ground engaging tool or part of a mining and/or loading equipment, which comprises one or more monitoring devices.

8 Claims, 2 Drawing Sheets

(51) Int. Cl.
    *E02F 9/26*      (2006.01)
    *B60Q 9/00*      (2006.01)
    *B65G 11/20*      (2006.01)
    *E02F 9/28*      (2006.01)
    *G08B 21/18*      (2006.01)

(52) U.S. Cl.
    CPC .......... *E02F 9/2808* (2013.01); *E02F 9/2883* (2013.01); *G01N 27/82* (2013.01); *G01V 3/10* (2013.01); *G08B 21/187* (2013.01); *B65G 2203/0275* (2013.01)

(56) References Cited

U.S. PATENT DOCUMENTS

| | | | |
|---|---|---|---|
| 8,411,930 B2 | 4/2013 | Ridley et al. | |
| 8,890,672 B2 | 11/2014 | Miller | |
| 9,311,513 B2 | 4/2016 | Miller | |
| 9,442,093 B2* | 9/2016 | Brandon | G01N 27/82 |
| 9,644,997 B2* | 5/2017 | Carbonne | G01M 15/06 |
| 10,316,497 B2 | 6/2019 | Miller | |
| 10,627,423 B2* | 4/2020 | Mirassou | G01P 3/489 |
| 2013/0026263 A1 | 1/2013 | Bamber et al. | |
| 2013/0049935 A1 | 2/2013 | Miller | |
| 2015/0284935 A1 | 10/2015 | Egger et al. | |
| 2017/0363762 A1 | 12/2017 | Pienaar et al. | |
| 2018/0171772 A1* | 6/2018 | Rodney | E21B 21/08 |

FOREIGN PATENT DOCUMENTS

| | | |
|---|---|---|
| CL | 2014/001897 A1 | 9/2014 |
| WO | 2012/107848 A1 | 6/2010 |
| WO | 2013/033164 A1 | 3/2013 |
| WO | 2014/026742 A1 | 2/2014 |
| WO | 2016/008059 A1 | 1/2016 |
| WO | 2016/090412 A1 | 6/2016 |

OTHER PUBLICATIONS

Chile office action dated Apr. 24, 2020; No. 201603404.
International Search Report dated Apr. 27, 2019: PCT/CL2017/000044.
Alma'Aitah, A., et al.; "Utilizing Sprouts WSN platform for equipment detection and localization in harsh environments", En Local Computar Networks Workshops (LCN Workshops), 2014.
Mineria Chilena; Sensor nanotechnologico para prevention de inchancables, (20171100), pp. 66-67, URL: http://www.mch.cl/wp-content/uploads/sites/4/217/111/MCH-437-Digital.pdf. (Apr. 10, 2018).

* cited by examiner

Figure 1
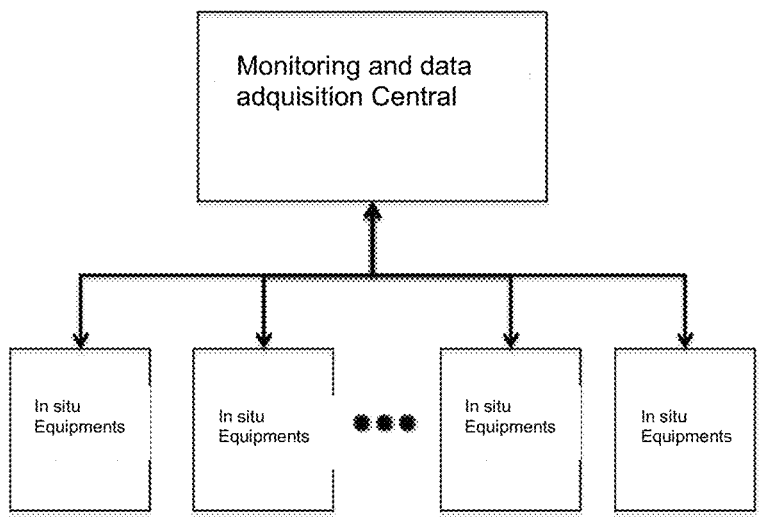
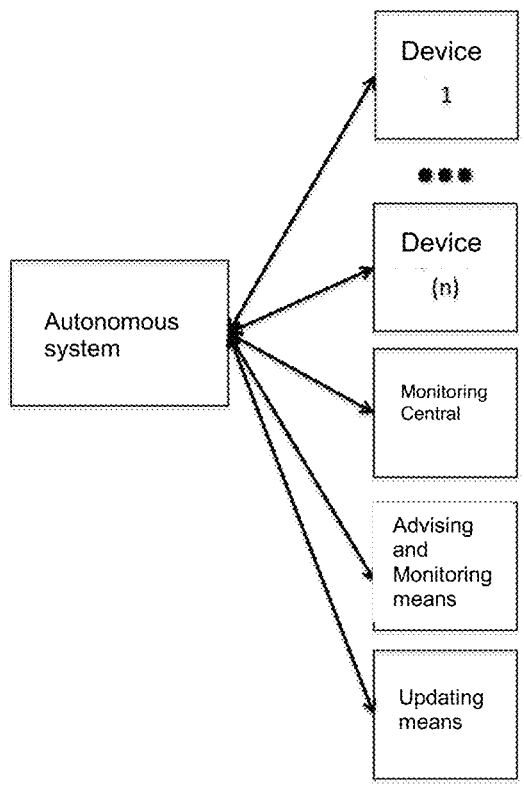
Figure 2

AUTONOMOUS MONITORING SYSTEM BASED ON MAGNETIC FIELD VARIATION, ALLOWING UNCRUSHABLE MATERIAL TO BE PREDICTED, ANTICIPATED AND DETECTED IN REAL TIME AND THEIR ASSOCIATED METHODS

BACKGROUND OF THE INVENTION

The mining industry has tried since the early days, not only optimizing the effectiveness and efficiency of all processes, but also reducing at least accidents of staff and also minimizing the arrests of mining processes, breakdowns and the destruction of mining equipment. Also, in order to ensure the highest possible degree of safety for people working on a task, it is necessary to prevent accidents resulting from wear of mining equipment. A constant search of solutions that solve this problem have been the attempts and some inventions to predict wear in such equipment before failure or breakage of materials and, consequently, possible accidents mentioned above. It has also been trying to avoid "hindering" the production process with material that should not participate in the process and that may appear in any mining operation due to a failure or breakage of a mining equipment or part of it, or due to the existence of "old mining". These elements are important in all the stages of the mining process, i.e. in the exploration, drilling and blasting, loading and transportation, even in the phase of winning and processing of mineral (processing plant).

In this context, and particularly at the stage of loading and transportation, a critical variables are not only finding odd metallic bodies or elements, inherited from "old mining", but also a permanent wearing and failures or risks of breaks of teeth and other components of shovels and loaders. These, because of their nature, undergo continuous wear due to impacts, high pressures and abrasions which are subjected at the time they are used for removal, loading and material movement. In case of failure or breakage of these, such pieces or parts of the teeth and other components of the shovels and wheel loaders, become into uncrushable metal pieces, which should not reach the process lines. These pieces are as resistant and uncrushable as the metallic compounds from the "old mining".

All these unwanted uncrushable metal elements are just called "uncrushables" since rock crushers, along with the different stages of the production line, cannot neither crush nor mill normally. If such is the case, it is likely to break or damage the crusher and, moreover, it is necessary to stop all the ongoing process with economic, technical and time consuming consequences that any stop implies. Furthermore, this stop will force maintenance personnel to enter to the crushing zone in order to remove the unwanted material, and if it is possible to repair the crusher and, consequently, the personnel working nearby could risk their health or life.

Indeed, if any of these uncrushables goes inside the bucket shovel or loader, will be deposited inside the dump truck, which will take them to the conveyor belts and then to the primary crusher and other units that process minerals.

Either in Chile or in the rest of the world, unscheduled stops due to the presence of these uncrushables constitute an unsolved problem or implementations of uncorrect solutions. Prevention systems that monitor bucket teeth breaking are ineffective and do not allow monitoring any other kind of uncrushable. Besides, it also does not aim to solve the fundamental problem which consists in determining at the moment of the failure of the shovel or piece or tooth, if this part or piece transforms it, by the fact of the event, into an uncrushable, that will be deposited inside or outside the mining shovel bucket. If this information is available, it could prevent the entry of uncrushables into the mining shovels buckets, the trucks, or other places of stock or transportation, preventing the advance of these materials to the crushing area, and other steps and equipment associated to the mining process.

Thus, the real-time detection of uncrushable material is, in general, a high importance issue in the mining industry, so it is desirable to have a system and method to monitor and detect this type of unwanted material, as soon as possible, ideally in real time.

The development of an autonomous monitoring system based on the magnetic field variation allows predicting, preventing and detecting in real time uncrushable material such as metal and/or "old mining" material or previous operations and/or parts or components of mining equipment, all the former strange bodies and uncrushable metal of mining equipment and/or loading; installation procedures; operations; and tooth, ground engaging tool or part of a mining equipment and/or loader that compromises one or more monitoring devices. Thus, the proposed autonomous system deserves to be protected, since it aims to directly solve a fundamental problem of unscheduled stops due to the appearance of these uncrushables elements in the mining industry.

In summary, it is desirable to have:

1.—an autonomous monitoring system by the magnetic field variation:

a.—that allows: i.—predicting wear, failures and breakages of mining equipment; ii.—prevents and detects, in real time, uncrushable material such as metal and/or "old mining" material or previous operations and/or parts or pieces of mining equipment;

b.—for being used/installed in extraction mining equipment and/or loading, such as, but not limited to, a cables shovel, a hydraulic shovel, a wheel loader or other kind of loader;

c.—that allows, by one hand, detecting strange metallic bodies, and also to know the level of wear and/or detect almost immediately a crack or fracture or breaks of some parts of these equipment, particularly, but not limited to teeth or parts of it, avoiding unscheduled stops and accidents of personnel, and improving effectiveness and efficiency in the planning of predictive and preventive maintenance;

2.—installation method of the system;

3.—operation method of the system; and

4.—tooth, ground engaging tool or part of a mining equipment and/or loader that compromises one or more monitoring devices.

After checking the prior art, among the closest documents that we have found, and worthy to be cited, we can mention the document U.S. Pat. No. 8,284,096. This document discloses a system and method for detecting uncrushable that basically works as a pulse-echo system. The installation of an antenna is proposed inside a shovel bucket or loader, which periodically emits an intense electromagnetic signal and waits for the electromagnetic echo generated by a possible uncrushable. The document states that the antenna must reach about 2000 volts to generate the emission pulse. This implies that the system must necessarily be fed by cable. The hostile environment in which the piece works, hostility due to forces, pressures and abrasion, makes unfeasible that the proposed equipment lasts over time.

Also, the prior art disclosed in U.S. Pat. No. 8,411,930 B2, a system and method for detecting missing parts of a damaged machine. The system includes a device installed on the machine that captures images of it and an image processor. The method works by acquiring images of the machine periodically and the identification of damaged parts is made by software. This detection system has the disadvantage that during mineral extraction the visibility that covers the teeth is lost because of dust, dirt and rocks.

WO 2013033164 A1 discloses a method for monitoring the position of a tooth of a heavy-duty machine by coupling a label (TAG) of radiofrequency identification technology (RFID). A RFID reader provides the information when a tooth that has a TAG is removed from the machine. The TAGs must be integrated inside the teeth in order to detect detachment. The inclusion of these elements within the teeth creates difficulties of communication with the external antenna. System operation requires a sufficiently deep destruction of the tooth in order to reach the TAG that is inside. If the tooth is broken and does not reach or destroys the TAG in the inside, the detached metallic element will not be detected, being the main problem of this technology.

Finally, the document WO2016008059 is equivalent to CL201401897 discloses a monitoring system for detecting ferromagnetic elements hidden in the loaded ore during loading and/or unloading of a container. However, such a system is installed in the bucket of a loader and/or truck, which means to hole the bucket to set the sensors and their respective protective devices, which means intervening a high cost element such as the bucket these characteristics, unlike the present application that uses as a key or critical element the teeth or other ground engaging tool of the mining equipment. Also, the proposed invention in that document does not allow predicting the wear of a part or piece of mining equipment. Finally, this invention does not consider the incorporation of means of magnetization for teeth, ground engaging tools or any piece of mining equipment.

Definitely, the prior art does not offer an effective solution to the technical problem, related to detect properly an uncrushable material, using the proposed system and method, which will be described in detail in the following paragraphs.

BRIEF DESCRIPTION OF THE INVENTION

It presents 1.—An autonomous monitoring system based on a magnetic field variation: (a) that allows (i) predicting wear, failures and cracks in mining equipment; (ii) prevent and detect, in real time, uncrushable material such as metal and/or material from "old mining" or past operations and/or parts or pieces of mining equipment; (b) to be used/installed in mining and/or loading equipment, such as, but not limited to, cables shovel, hydraulic shovel, a loader or other type of loader; (c) that allows detecting strange metal bodies, and also, knowing the level of wear and/or detecting a failure or fracture in the parts of these equipment almost immediately, particularly, but not limited to, the teeth or part of them, preventing unscheduled stops and accidents of the personnel, and improving effectiveness and efficiency in the planning of predictive and preventative maintenance operations;

2.—an installation method of the system.

3.—an operating method of the system.

4.—tooth, ground engaging tool or part of a mining and/or loading equipment, which comprises one or more monitoring devices.

DETAILED DESCRIPTION OF THE INVENTION

The base of the system and the methodology of the current application is the use of a device composed by magnetic sensors that are strategically arranged, and that can detect magnetic field variations during the extraction process, or loading or movement. The arrangement can be made, for example, in the tooth of a shovel or bucket, or in other elements used for extraction, loading and movement of the ore. In the case of implementing, for example, the sensors in the tooth of a shovel, these will detect magnetic field variations indicating the "state" of the tooth and consequently also possible fracture or break of it or part of it.

Continuing with the same example of the device positioned in a preferred mode in a tooth of a shovel, the monitoring of each tooth is performed in real time, and determines either the wear rate or the status of a fracture or break, sending such information to one or more hardware/software centers, which maintain updated information of the status of each tooth.

Always with the same example, when working, the tooth of the shovel "will feel" any material or strange and uncrushable metal body, coming from previous mining operations or from "old mining".

When the device detects a strange or uncrushable metal body or when an event of fracture or break occurs, transforming a tooth or a portion of it in an odd and uncrushable metal body, the system will notify the operator of the shovel and the maintenance unit, allowing to deposit the load that compromises the strange metal body in another place and thus preventing the presence of the uncrushable material inside the bucket or the truck or the conveyor belt or any other equipment, allowing the operator to redirect the load or according to of any particular protocol of the mining company.

To facilitate the understanding of the constructive and functional characteristics of the present invention, it is described with the following figures, always using the example of the device in a tooth of a shovel.

FIG. 1: shows a complete diagram of the system of the present invention.

FIG. 2 shows a complete diagram of the autonomous system of the present invention.

FIG. 1 shows a general outline of the present invention, which is shown schematically the equipment in the field with the proposed technology. It is possible to appreciate the communication among the equipment in the field and the monitoring and acquisition central station, so that monitoring is performed for each tooth in real time, updating the information and the status of each tooth.

As shown in this figure, monitoring the status of each tooth will allow the communication of the monitoring and data acquisition central station, either with the entities that the maintenance center considered appropriate such as maintenance units, the processing plant and other critical areas, for, thus redirect the load, performing a predictive, preventive or corrective maintenance to loading equipment, or updating the databases of the ore and their final destination.

FIG. 2 shows a diagram with the main elements of the autonomous system, such as one or many devices implemented inside each tooth or ground engaging tool, the monitoring station, the warning alarms, and the means to perform the updates.

Figure 3:
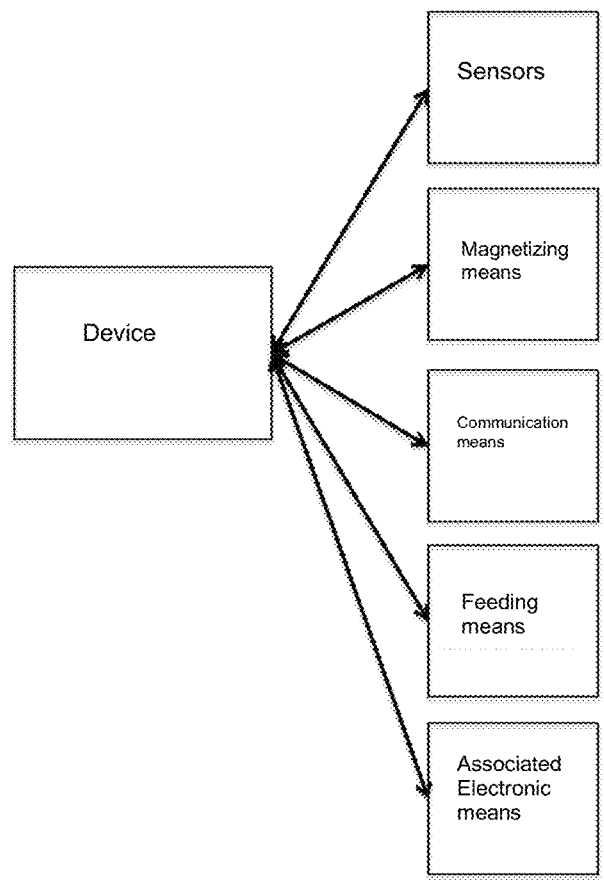
FIG. 3 shows a complete diagram of the device of the present invention.

FIG. 3 shows a diagram with main elements of the device of the present invention, such as magnetic field sensors, means to perform magnetization, means to perform the communication, and the means to power up along with the associated electronics used in the system. The means for magnetization may comprise magnetic field induction by electric current. Optionally, the means for magnetization may comprise means that include bringing a ferromagnetic material or magnet, or magnetic field generator to a magnetizable region. Still optionally, the means for magnetization may comprise coils.

Figure 4:
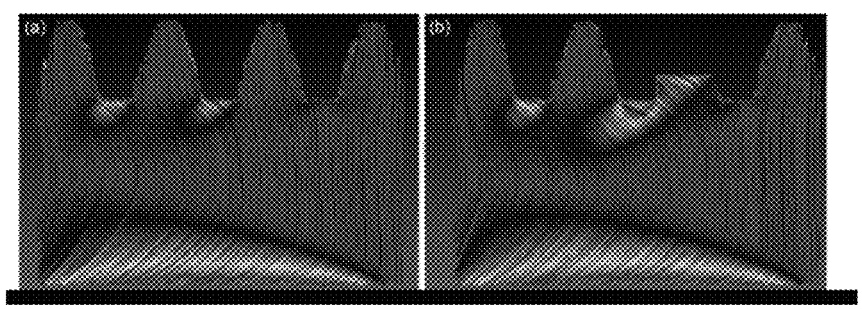
FIG. 4 shows a simulation of tooth fracture in loading equipment.

FIG. 4 shows a simulation of a fracture of a tooth of loading equipment, which allows monitoring of each tooth in real time and will determine the state of their fracture or break. Such information, as mentioned above, will be sent to the monitoring and data acquisition station, updating the current state of each tooth. The cited figure shows a computational simulation that exemplifies the lines of the magnetic field in a section of the mining shovel, where four teeth and part of a bucket are included. FIG. 4(a) and FIG. 4(b) show the variations of the magnetic field lines before and after, respectively, produced by the loss of one of teeth of the shovel. In the figure, the colors represent the change in intensity of the magnetic field in arbitrary units.

Detection of uncrushable entering to the bucket will be performed similarly to the method described above. The methodology is based on a similar concept to that used for metal detectors (eg. detection airport metal) consisting of sensors that detect magnetic fields produced by Foucault currents that are induced by applying a variable magnetic field over a conductor, or by relative movement of a conductive metal against a source of magnetic field. Unlike that method, herein a constant magnetic field created by means of magnetization, which will induce an electrical Foucault current whenever a uncrushable (metallic conductor) enters the magnetic field region. That is, the movement of the uncrushable will be used to induce a magnetic field variation to be detected by the sensors.

A first embodiment of the present invention, an autonomous monitoring system by magnetic field variation is proposed:

(a) that allows (i) predicting wear, failures and cracks in mining equipment: (ii) prevent and detect, in real time, uncrushable material such as metal and/or material from "old mining" or past operations and/or parts or pieces of mining equipment; (b) to be used/installed in mining and/or loading equipment, such as, but not limited to, cables shovel, hydraulic shovel, a loader or other type of loader; (c) that allows detecting strange metal bodies, and also, knowing the level of wear and/or detecting a failure or fracture in the parts of these equipment almost immediately, particularly, but not limited to, the teeth or part of them, preventing unscheduled stops and accidents of the personnel, and improving effectiveness and efficiency in the planning of predictive and preventative maintenance operations;

Such system described above comprises, firstly, one or more devices installed inside the teeth, ground engaging tools, or another part of mining and/or loading equipment or both, wherein such device comprises: a1) one or more magnetic field and/or magnetic flux sensors that allow to constantly measure magnetic field variations in teeth, ground engaging tools or other mining and/or loading equipment; a2) means to perform magnetization over the teeth, ground engaging tools or another part of an mining and/or loading equipment; a3) means to communicate the information obtained by one or more sensors to the monitoring and data acquisition station, related to the level of wear, and the status of a possible fracture or failure; a4) means to power up; and a5) associated electronics.

The devices described above allow the sensors to remain in the piece that is being monitoring and not be detached, break or fracture due to wear from the operation itself. These sensors will allow detecting in real time the presence of strange bodies or uncrushable metal, as to either determine in real time the status of ground engaging tools in mining equipment or to detect an entry of uncrushable material to the bucket of such mining equipment.

This device is comprised in the essential element of the present invention, since this is the one that allows having a permanent tracking of the conditions of the each part of the equipment.

Moreover, the system comprises one or more monitoring and data acquisition central stations, composed by hardware and software, and means to send warnings and/or alarms to the operator of mining equipment, in such a way that at the moment when an equipment, or part of it, breaks, that piece could be separated, not allowing the entrance of an uncrushable material into the stages of crushing, milling and/or any other process after ore loading.

The system also comprises means to keep the status information updated in each tooth, ground engaging tool or any other part of the equipment through a constant sweep query.

A second embodiment of the invention, a method of installing an autonomous monitoring system for mining equipment is presented, by magnetic field variation: (a) that allows (i) predicting wear, failures and cracks in mining equipment; (ii) prevent and detect, in real time, uncrushable material such as metal and/or material from "old mining" or past operations and/or parts or pieces of mining equipment; (b) to be used/installed in mining and/or loading equipment, such as, but not limited to, cables shovel, hydraulic shovel, a loader or other type of loader; (c) that allows detecting strange metal bodies, and also, knowing the level of wear and/or detecting a failure or fracture in the parts of these equipment almost immediately, particularly, but not limited to, the teeth or part of them, preventing unscheduled stops and accidents of the personnel, and improving effectiveness and efficiency in the planning of predictive and preventative maintenance operations;

Such method comprises, firstly, the installation of one or more devices inside the teeth, ground engaging tools or another part of a mining equipment, in a position of low pressure and abrasion against frontal stresses, such location is defined by modeling the safest zones of the tooth, ground engaging tool or another part of the equipment. Such device comprises: one or more magnetic field and/or magnetic flux sensors, means to perform magnetization over teeth, ground engaging tool or any other part of mining and/or loading equipment. Modeling allows the cited (one or more) sensors above to remain inside the piece to be monitored and not to fall down, get destroyed or break down due to wear from the operation itself. These sensors will allow detecting in real time either the state of the ground engaging tools in mining equipment or the entry of uncrushable material into the bucket of such mining equipment; means for constantly measure magnetic field variations in teeth, ground engaging tools or any other part of mining and/or loading equipment; means for sending the obtained information by one or more sensors, to the monitoring and data acquisition station, related to wear level and the state of an eventual fracture or rupture. The installation of such devices is done on strategic places of the teeth, ground engaging tools or any other part of mining and/or loading equipment to determine in real time either the state of the ground engaging tools in mining equipment or an entry of uncrushable material into the bucket of such mining equipment.

The following stages of the installation method correspond to test the communication of one or more devices with one or more monitoring and data acquisition stations, according to the mine sites assigned frequency; device calibration; and finally verify testing sequence.

Similarly, this method could comprise resetting the system once an event of a uncrushable detection occurs. Also, it could be reset at each shift change.

A third embodiment of the invention, a method for operating an autonomous monitoring system through magnetic field variation is presented: (a) that allows (i) predicting wear, failures and cracks in mining equipment; (ii) prevent and detect, in real time, uncrushable material such as metal and/or material from "old mining" or past operations and/or parts or pieces of mining equipment; (b) to be used/installed in mining and/or loading equipment, such as, but not limited to, cables shovel, hydraulic shovel, a loader or other type of loader; (c) that allows detecting strange metal bodies, and also, knowing the level of wear and/or detecting a failure or fracture in the parts of these equipment almost immediately, particularly, but not limited to, the teeth or part of them, preventing unscheduled stops and accidents of the personnel, and improving effectiveness and efficiency in the planning of predictive and preventative maintenance operations; This operation method comprises continuous measurements of magnetic field variation in the teeth, ground engaging tools or any other part of mining and/or loading equipment; through the acquired information by one or more magnetic field/flux sensors inside a device that is installed within the teeth, ground engaging tools or any other part of mining and/or loading equipment, in a position of low pressure and abrasion against frontal stresses, such location is defined by modeling the safest zones of the tooth, ground engaging tool or another part of the equipment; in order to keep the device fixed and protected in the safest place of the piece and to remain attached to the piece to be monitored and do not fall off due to impacts, high pressures and abrasions, in order to determine in real time the status of the ground engaging tools in mining equipment and to detect an entry of uncrushable material into the bucket of such mining equipment.

Also, the operation method comprises the monitoring of teeth state, ground engaging tools or any other part of mining and/or loading equipment; send information to a monitoring and data acquisition central station, related to wear level, and state of an eventual fracture or rupture; give warnings and/or alarms to the operator of a mining machine, in such a way, that at the moment when an equipment, or part of it, breaks, breaks, that piece could be separated, not allowing the entrance of an uncrushable material into the stages of crushing, milling and/or any other process after ore loading; and to keep the status information updated in each tooth, ground engaging tool or any other part of the equipment through a constant sweep query.

Finally, a tooth, a ground engaging tool or any other part of mining and/or loading equipment with one or more devices are presented, comprising:

a) that allows (i) predicting wear, failures and cracks in mining equipment; (ii) prevent and detect, in real time, uncrushable material such as metal and/or material from "old mining" or past operations and/or parts or pieces of mining equipment; (b) to be used/installed in mining and/or loading equipment, such as, but not limited to, cables shovel, hydraulic shovel, a loader or other type of loader; (c) that allows detecting strange metal bodies, and also, knowing the level of wear and/or detecting a failure or fracture in the parts of these equipment almost immediately, particularly, but not limited to, the teeth or part of them, preventing unscheduled stops and accidents of the personnel, and improving effectiveness and efficiency in the planning of predictive and preventative maintenance operations;

The ground engaging tool mentioned above or any other part of mining equipment comprises as fundamental part, a) a device installed inside the tooth, ground engaging tool or any other part of mining and/or loading equipment, in a low pressure and abrasion location against frontal stresses, in a position of low pressure and abrasion against frontal stresses, such location is defined by modeling the safest zones of the tooth, ground engaging tool or another part of the equipment, where such device comprises: a1) one or more magnetic field and/or magnetic flux sensors that allow to constantly measure magnetic field variations in teeth, ground engaging tools or other mining and/or loading equipment; a2) means to perform magnetization over the teeth, ground engaging tools or another part of an mining and/or loading equipment; a3) means to communicate the information obtained by one or more sensors to the monitoring and data acquisition station, related to the level of wear, and the status of a possible fracture or failure; a4) means to power up; and a5) associated electronics.

After the detailed description of the present invention on their four embodiments, in the next section the set of claims with system and method categories are presented, along with the technical detail of each embodiment, that is to say, autonomous system; installation method; operation method; and tooth, ground engaging tool or any other part of mining and/or loading equipment.

What is claimed:

1. An autonomous monitoring system based on magnetic field or magnetic flux variation or both, for predicting, preventing, and detecting in real time uncrushable/unbreakable material such as metal, one or more metal pieces either being own or not, or an own metal piece of mining extraction equipment or loading equipment including cables shovel, a hydraulic shovel, or a frontal loader and further detecting a degree of wearing, cracking, fracturing, breaking or a combination thereof, of one or more parts of such mining extraction equipment or loading equipment, a tooth or a part of them, avoiding unscheduled stops of such extracting mining equipment or loading equipment and accidents, enabling a planned predictive and preventive maintenance comprising:

a) one or more devices installed at said one or more parts of said mining extraction equipment or loading equipment, selected said part from a tooth or a part thereof wherein such devices are distributed at said one or more parts of such mining extraction equipment or loading equipment, selected from a tooth or a part thereof, in such a way that there is one device on each tooth, thus avoiding its detachment, breaking or fracture when the mining extracting equipment or loading equipment is operating, being such site safe, a site of low pressure and abrasion faced to frontal stress, tooth comprising each device:

a1) a magnetic field sensor, a magnetic flux sensor or both, which constantly measure variations in the signals associated to such magnetic field, magnetic flux or both, to said one or more tooth parts of the mining extracting equipment or loading equipment, selected from a tooth or a part thereof;

a2) means for magnetizing said one or more parts of such mining extracting equipment or loading equipment, selected from a tooth or a part thereof tooth;

a3) electronic means sending monitoring and acquisition data forward one or more monitoring central stations;

a4) electronic circuits;

wherein the device is further configured to send one or more monitoring and data acquisition central station of such variations in the measurements obtained from said magnetic field sensor or said magnetic flux sensor or both, determining from such data the presence of such uncrushable/unbreakable material and the wearing level of such one or more parts of such mining extracting equipment or loading equipment, selected from tooth or parts thereof; or breaking, cracking, fracturing or breaking off;

b) one or more monitoring and data acquisition central stations composed by hardware/software;

c) the monitoring and data acquisition central station is further configured to emit a warning an operator of the mining extracting equipment or loading equipment of the presence of an uncrushable material or the cracking, fracturing or breaking of one or more parts of such mining extracting equipment or loading equipment; the monitoring and data acquisition central station is further configured to generate a warning signal to an operator of the mining extracting equipment or loading equipment of the presence of an uncrushable/unbreakable material or the cracking, fracturing or breaking of one or more parts of the mining extracting equipment or loading equipment;

d) the monitoring and data acquisition central station is further configured to keep updated information of the presence or wearing level of each of said one or more parts of such mining extracting equipment or loading equipment selected from a tooth or a part thereof through while a routine or sweeping process or constant query.

2. The system according to claim 1, wherein said mining equipment corresponds to a cables shovel.

3. The system according to claim 1, wherein said mining equipment corresponds to a hydraulic shovel.

4. The system according to claim 1, wherein said mining equipment corresponds to a loader.

5. The system according to claim 1, wherein said mining equipment corresponds to a bucket.

6. The system according to claim 1, wherein said monitoring or data acquisition central station comprising one or more graphical user interfaces.

7. Method of installation of an autonomous monitoring system based on a magnetic field or magnetic flux variation or both that allows to predict, prevent and detect in real time the presence of uncrushable/unbreakable material, including one or more metal pieces either being own or not or part of a mining extraction equipment or loading equipment, including a cable shovel, hydraulic shovel or a front loader, and further detecting the level of wearing, breaking, cracking or fracturing or a combination thereof, in each one or more parts of said mining extracting equipment or loading equipment selected from a tooth or part thereof, avoiding unscheduled stops and accidents enabling a planned preventative and preventive maintenance, comprising the following stages:

installing a device at a safe site of such one or more part of such mining extraction equipment or such loading equipment selected from a tooth or part thereof, being said safe site a site of low pressure or abrasion faced to frontal stress and which has been previously determined by a previous modeling under an operation status to said mining extraction equipment or loading equipment, wherein one device is located per tooth, wherein the device comprising:

a1) a magnetic field sensor, a magnetic flux sensor or both, constantly measuring magnetic field or magnetic flux variations or both in said one or more parts of said mining extraction equipment or loading equipment selected from a tooth or part thereof;

a2) means for magnetizing said one or more parts of said mining extracting equipment or loading equipment selected from a tooth or part thereof;

wherein the device is configured to send information to one or more monitoring and acquisition data central stations, said information are the measurements of magnetic field, flux or both performed by said field sensor or magnetic flux sensor from which the presence of uncrushable/unbreakable material is determined as well the wearing level of said one or more parts of said mining extraction equipment or loading equipment or its cracking fracturing or breaking;

b) testing communication among said one or more devices and one or more monitoring and acquisition data central stations as a communication frequency assigned by the mine site;

c) calibrating such one or more devices;

d) verily testing sequence of step b).

8. Method of monitoring a magnetic field or magnetic flux variation or both to predict, prevent and detect in real time the presence of uncrushable/unbreakable material, including one or more metal pieces being either own or not or from an extraction mining equipment or loading equipment, including a cable shovel and hydraulic shovel or a front loader and further detecting a level of wearing, breaking, cracking or fracturing or a combination thereof, in one or more parts of such mining extraction equipment selected from a tooth or a part thereof avoiding unscheduled stops in said mining extraction equipment or loading equipment and further accidents and improving effectiveness and efficiency in a planned predictive and preventive maintenance, comprising the following steps:

a) continuously measuring variations in the magnetic field, magnetic flux measurements or both, in one or more parts of said mining extraction equipment or loading equipment selected of tooth or parts thereof, by a magnetic field sensor or magnetic flux sensor located inside a device installed in said part of said mining extraction equipment or loading equipment or both, selected from a tooth or part thereof, wherein said one or more devices are locate in turn at a position of low pressure and abrasion faced to a frontal stress and which has been previously determined as safe zone through a modeling of said one or more parts of said mining extraction equipment or loading equipment under an operation status and wherein a device per tooth is distributed;

b) monitoring presence or wearing level of said tooth or part thereof of the mining extraction equipment or loading equipment;

c) sending information of variation of the measurements of magnetic fields, magnetic flux or both to a monitoring and acquisition data center station and detecting the presence of an uncrushable/unbreakable material or wearing level or cracking, fracturing or breaking or a combination thereof, in one or more parts of said mining extraction equipment or loading equipment, selected from tooth to confirm a change of pattern in said variations of measurements to magnetic field, magnetic flux or both, which are recollected from said magenta field sensor, magnetic flux or both to a monitoring and data acquisition central station;
d) sending a warning signal to an operator of said mining extraction equipment or loading equipment, to the presence of an uncrushable/unbreakable material or a breaking, fracturing or cracking of said part of mining extraction equipment or loading equipment; and
e) keeping the information of the state of each tooth by a routine process or constant query.

\* \* \* \* \*